(12) United States Patent
Moore et al.

(10) Patent No.: US 10,737,615 B1
(45) Date of Patent: Aug. 11, 2020

(54) BABY CARSEAT REMINDER SYSTEM

(71) Applicants: Anthonie Moore, Lauderdale Lakes, FL (US); Genaro Valenzuela, Lauderdale Lakes, FL (US); Jose Valenzuela, Lauderdale Lakes, FL (US)

(72) Inventors: Anthonie Moore, Lauderdale Lakes, FL (US); Genaro Valenzuela, Lauderdale Lakes, FL (US); Jose Valenzuela, Lauderdale Lakes, FL (US)

( * ) Notice: Subject to any disclaimer, the term of this patent is extended or adjusted under 35 U.S.C. 154(b) by 57 days.

(21) Appl. No.: 16/247,710

(22) Filed: Jan. 15, 2019

(51) Int. Cl.
*B60Q 9/00* (2006.01)
*G08B 21/02* (2006.01)
*B60R 22/48* (2006.01)

(52) U.S. Cl.
CPC ............. *B60Q 9/00* (2013.01); *B60R 22/48* (2013.01); *G08B 21/02* (2013.01); *B60R 2022/4816* (2013.01); *B60R 2022/4866* (2013.01)

(58) Field of Classification Search
CPC .................................... G08B 1/00; B60N 2/00
See application file for complete search history.

(56) References Cited

U.S. PATENT DOCUMENTS

| | | | |
|---|---|---|---|
| 6,924,742 | B2 | 8/2005 | Mesina |
| D530,883 | S | 10/2006 | Cholewa |
| 8,038,213 | B2 | 10/2011 | Owens |
| 8,217,770 | B2 | 7/2012 | Messner |
| 2006/0103516 | A1 | 5/2006 | Zang |
| 2006/0273917 | A1 | 12/2006 | Rams |
| 2013/0033373 | A1* | 2/2013 | Thomas ................ B60N 2/002 340/457.1 |

FOREIGN PATENT DOCUMENTS

WO   2009144687   1/2010

* cited by examiner

*Primary Examiner* — Shirley Lu

(57) ABSTRACT

The baby carseat reminder system is an alarm and sensor system that attaches to the seat belt buckle. The baby carseat reminder system senses when the belt connector of a seat belt properly attaches to the anchor connector of the seatbelt. The baby carseat reminder system senses when the span of the distance between the seat belt buckle and an alarm fob is greater than a previously determined distance. The baby carseat reminder system generates a visual signal when the belt connector is properly inserted into the anchor connector. The baby carseat reminder system generates an audible and tactile alarm when the span of the distance between the seat belt buckle and the alarm fob is greater than a previously determined distance.

19 Claims, 6 Drawing Sheets

BABY CARSEAT REMINDER SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including safety belts and harnesses in a vehicle, more specifically, a control system with a means for sensing the latching of a seat belt buckle. (B60R2022/4816)

SUMMARY OF INVENTION

The baby carseat reminder system is configured for use with a child safety seat. The baby carseat reminder system is configured for use with a seat belt buckle. The seat belt buckle further comprises a belt connector and an anchor connector. The belt connector removably attaches to the anchor connector. The baby carseat reminder system is an alarm and sensor system that attaches to the seat belt buckle. The baby carseat reminder system senses when the belt connector is properly attached to the anchor connector. The baby carseat reminder system senses when the span of the distance between the seat belt buckle and an alarm fob is greater than a previously determined distance. The baby carseat reminder system generates a visual signal when the belt connector properly inserts into the anchor connector. The baby carseat reminder system generates an audible and tactile alarm when the span of the distance between the seat belt buckle and the alarm fob is greater than a previously determined distance. The baby carseat reminder system comprises a belt clip, an anchor clip, and the alarm fob. The belt clip attaches to the belt connector. The anchor clip attaches to the anchor connector. The alarm fob communicates with the anchor clip using a wireless communication link. The anchor clip monitors the position of the belt clip relative to the anchor clip. The alarm fob monitors the span of distance between the alarm fob and the anchor clip.

These together with additional objects, features and advantages of the baby carseat reminder system will be readily apparent to those of ordinary skill in the art upon reading the following detailed description of the presently preferred, but nonetheless illustrative, embodiments when taken in conjunction with the accompanying drawings.

In this respect, before explaining the current embodiments of the baby carseat reminder system in detail, it is to be understood that the baby carseat reminder system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the baby carseat reminder system.

It is therefore important that the claims be regarded as including such equivalent construction insofar as they do not depart from the spirit and scope of the baby carseat reminder system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
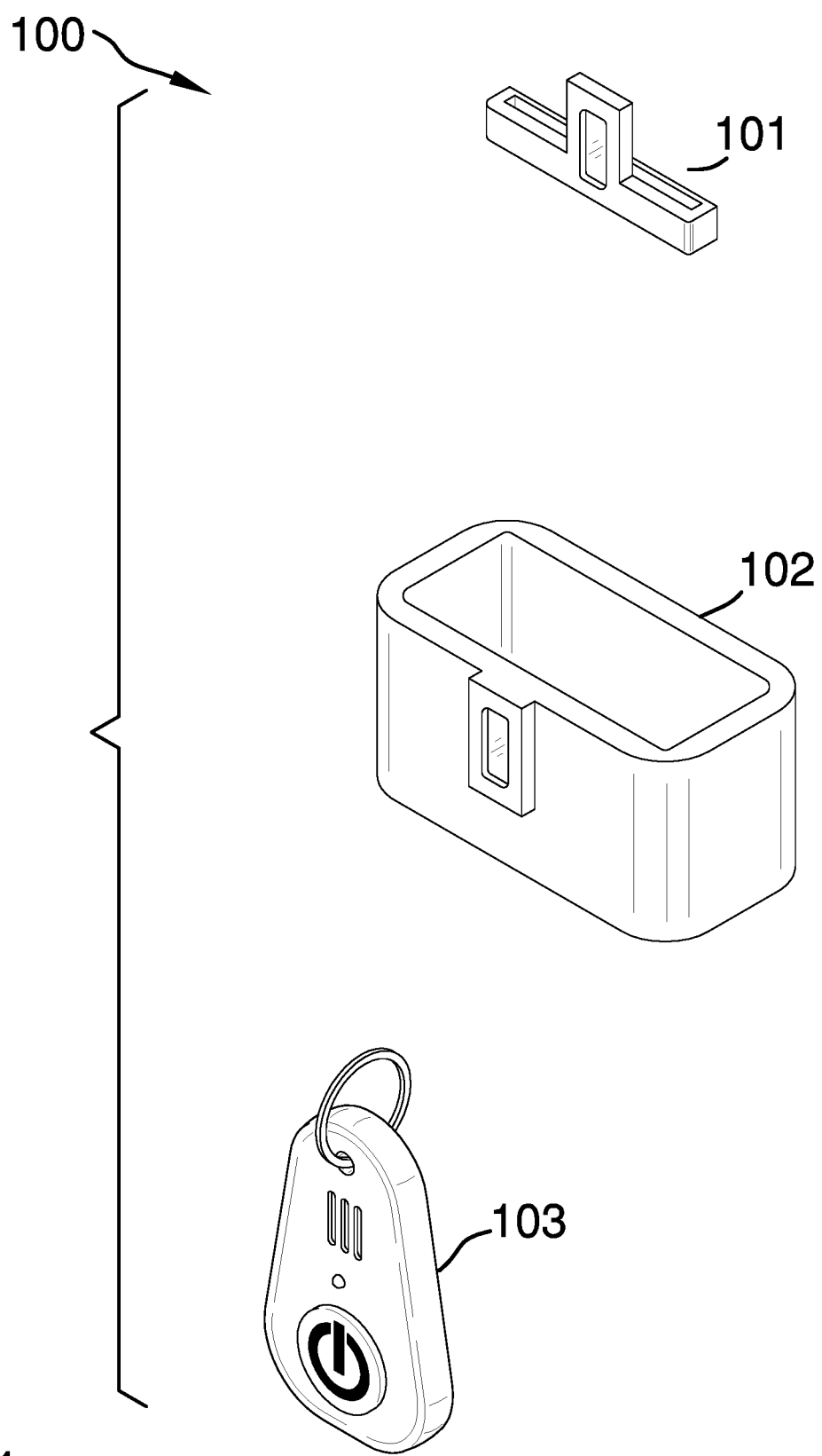
FIG. 1 is a perspective view of an embodiment of the disclosure.
Figure 2:
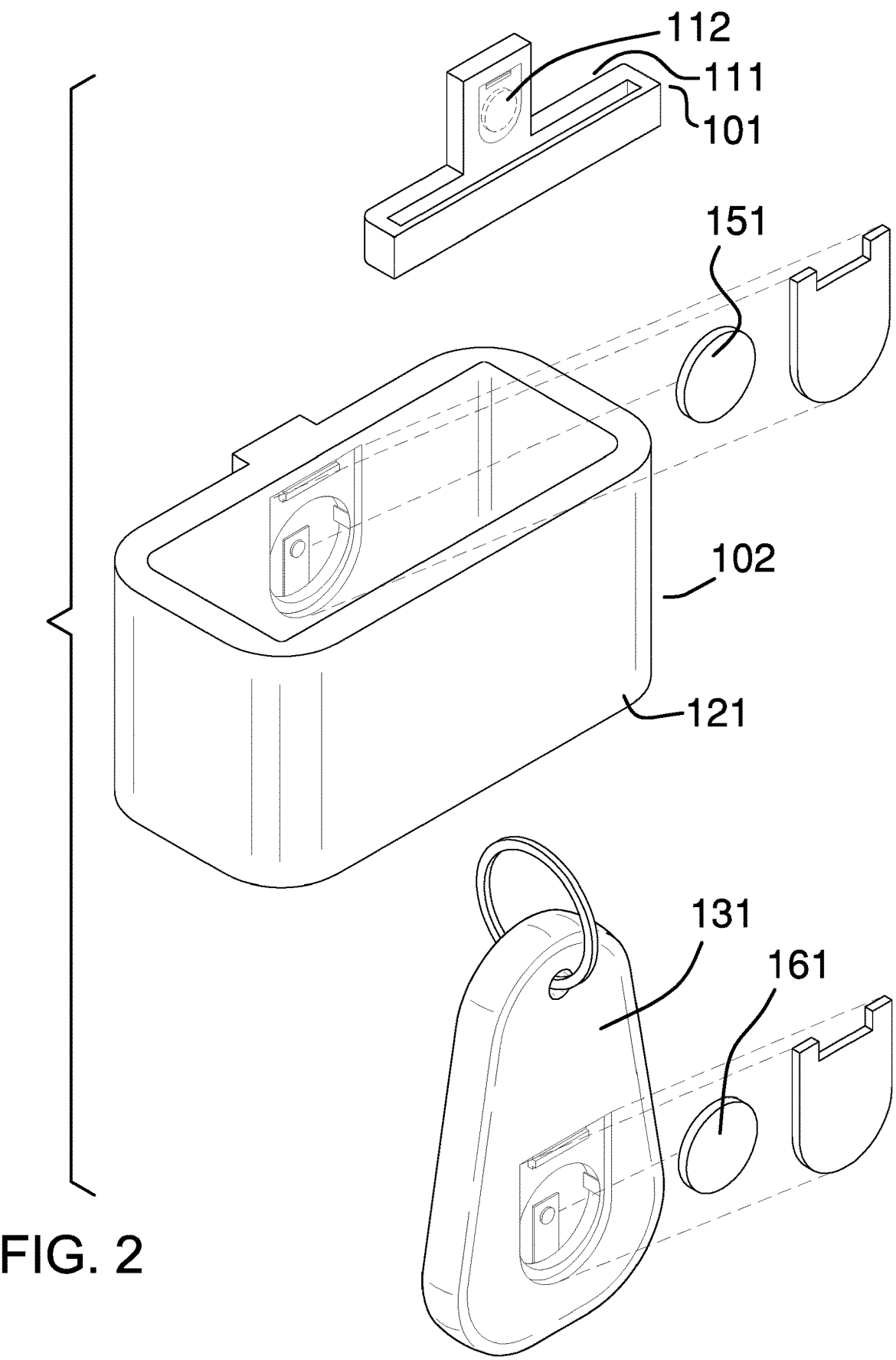
FIG. 2 is an exploded view of an embodiment of the disclosure.
Figure 3:
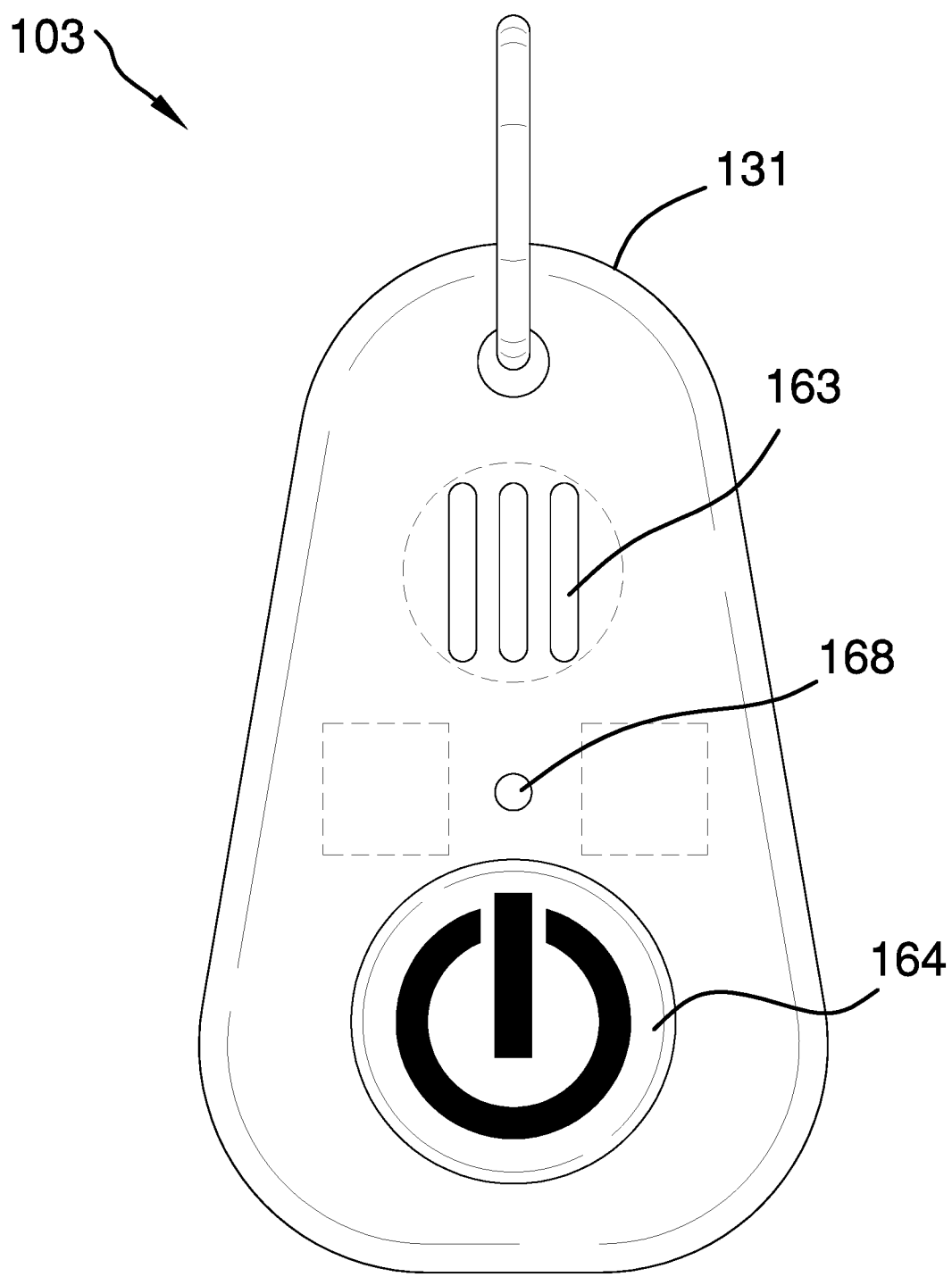
FIG. 3 is a detail view of an embodiment of the disclosure.
Figure 4:
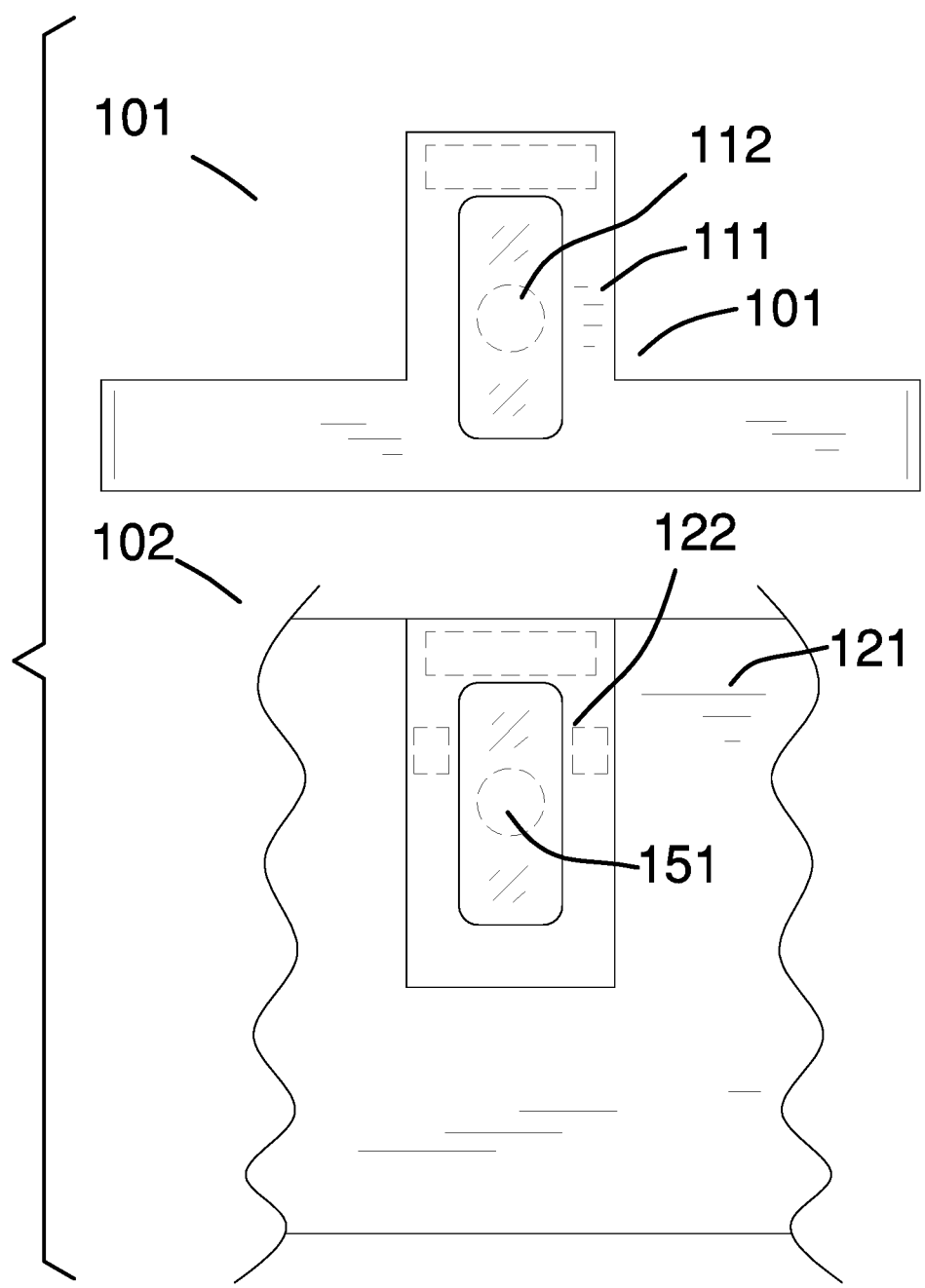
FIG. 4 is a detail view of an embodiment of the disclosure.
Figure 5:
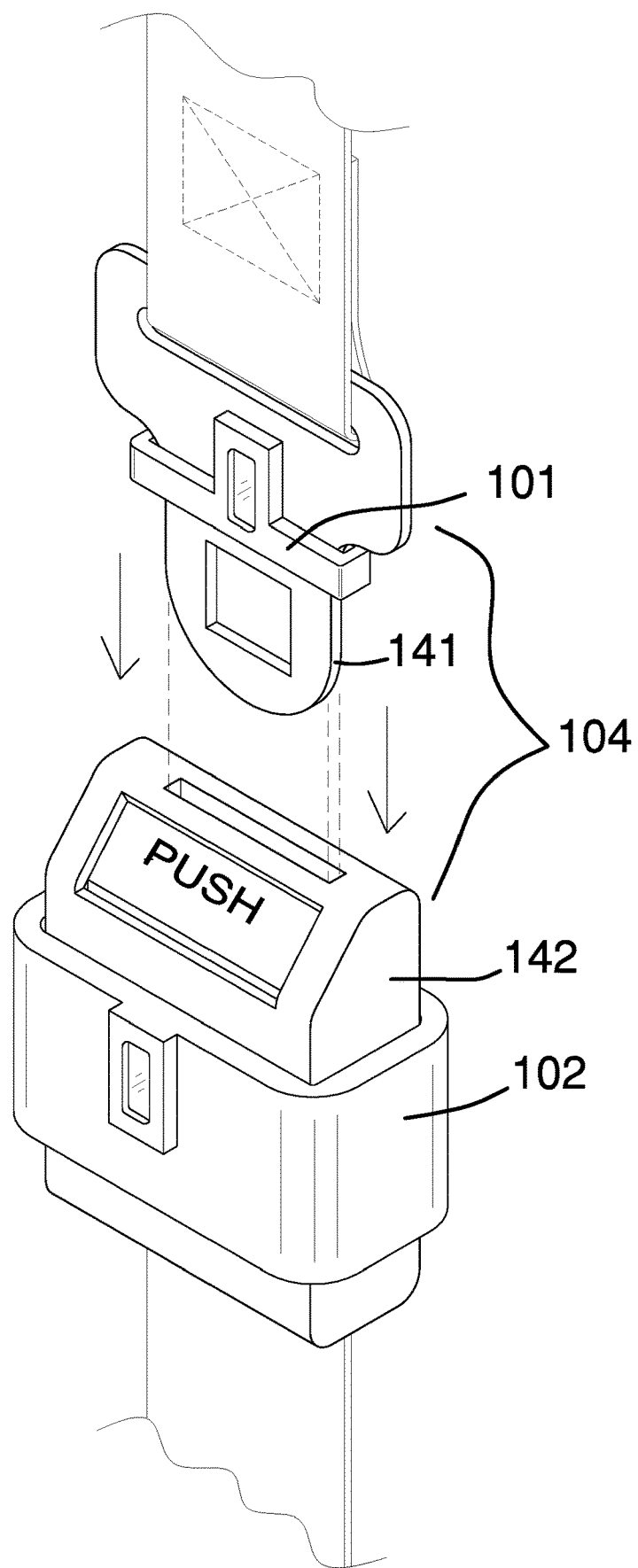
FIG. 5 is an in use view of an embodiment of the disclosure.

Detailed reference will now be made to one or more potential embodiments of the disclosure, which are illustrated in FIGS. 1 through 5.

The baby carseat reminder system 100 (hereinafter invention) is configured for use with a child safety seat. The invention 100 is configured for use with a seatbelt buckle 104. The seatbelt buckle 104 is a fastening structure used secure a seatbelt around a passenger. The seatbelt buckle 104 is a well-known and documented structure in the transportation arts. The seatbelt buckle 104 further comprises a belt connector 141 and an anchor connector 142. The belt connector 141 removably attaches to the anchor connector 142. The invention 100 is an alarm and sensor system that attaches to the seatbelt buckle 104. The invention 100 senses when the belt connector 141 is properly attached to the anchor connector 142. The belt connector 141 is the male component of the seatbelt buckle 104. The anchor connector 142 is the female component of the seatbelt buckle 104.

The invention 100 senses when the span of the distance between the seatbelt buckle 104 and an alarm fob 103 is greater than a previously determined distance. The invention 100 generates a visual signal when the belt connector 141 is properly inserted into the anchor connector 142. The invention 100 generates an audible and tactile alarm when the span of the distance between the seatbelt buckle 104 and the alarm fob 103 is greater than a previously determined distance.

The invention 100 comprises a belt clip 101, an anchor clip 102, and the alarm fob 103. The belt clip 101 attaches to the belt connector 141. The anchor clip 102 attaches to the anchor connector 142. The alarm fob 103 communicates with the anchor clip 102 using a wireless communication link 105. The anchor clip 102 monitors the position of the belt clip 101 relative to the anchor clip 102. The alarm fob 103 monitors the span of distance between the alarm fob 103 and the anchor clip 102.

The belt clip 101 attaches to the belt connector 141 of the seatbelt buckle 104. The belt clip 101 forms a magnetic token device that generates a magnetic field that is detected by the anchor clip 102. The magnetic field generated by the belt clip 101 is sensed by the anchor clip 102 such that the anchor clip 102 detects the position of the belt clip 101 relative to the anchor clip 102. The design of the belt clip 101 is such that the belt clip 101 actuates the anchor clip 102 when the belt connector 141 is properly fastened to the anchor connector 142. The belt clip 101 comprises a belt clip housing 111 and a magnet 112.

The belt clip housing 111 is a casing. The belt clip housing 111 is a semi-rigid structure with an elastic nature. The belt clip housing 111 contains the magnet 112. The belt clip housing 111 is formed with all apertures and form factors necessary to allow the belt clip housing 111 to accommodate the use and operation of the invention 100. Methods to form a belt clip housing 111 suitable for the purposes described in this disclosure are well-known and documented in the mechanical arts.

The belt clip housing 111 forms a spring-like structure that clamps onto the belt connector 141 of the seatbelt buckle 104 such that the span of the distance between the belt clip 101 and the anchor clip 102 is at a minimum when the belt connector 141 is properly secured to the anchor connector 142.

The magnet 112 is a permanent magnet. The magnet 112 installs in the belt clip housing 111. The magnet 112 forms a magnetic field that surrounds the belt clip 101.

The anchor clip 102 attaches to the anchor connector 142 of the seatbelt buckle 104. The anchor clip 102 detects the magnetic field generated by the belt clip 101. The anchor clip 102 initiates the wireless communication link 105 between the anchor clip 102 and the alarm fob 103 once the belt clip 101 actuates the anchor clip 102. The anchor clip 102 communicates to the alarm fob 103 using a wireless communication link 105. The anchor clip 102 comprises an anchor clip housing 121 and an anchor circuit 122.

The wireless communication link 105 is a radio frequency link established between the anchor clip 102 and the alarm fob 103 by the anchor clip 102. The actuation of the anchor clip 102 by the belt clip 101 initiates the establishment of the wireless communication link 105. When the wireless communication link 105 between the anchor clip 102 and the alarm fob 103 is lost, the alarm fob 103 activates the audio and tactile alarms under the assumption that the loss of the wireless communication link 105 is the result of the distance between the anchor clip 102 and the alarm fob 103.

The anchor clip housing 121 is a casing. The anchor clip housing 121 is a semi-rigid structure with an elastic nature. The anchor clip housing 121 contains the anchor circuit 122. The anchor clip housing 121 is formed with all apertures and form factors necessary to allow the anchor clip housing 121 to accommodate the use and operation of the invention 100. Methods to form an anchor clip housing 121 suitable for the purposes described in this disclosure are well-known and documented in the mechanical arts.

The anchor clip housing 121 forms a spring-like structure that clamps onto the anchor connector 142 of the seatbelt buckle 104 such that the span of the distance between the belt clip 101 and the anchor clip 102 is at a minimum when the belt connector 141 is properly secured to the anchor connector 142.

The anchor circuit 122 is an electrical circuit. The anchor circuit 122 generates and terminates the wireless communication link 105 based on the presence of the magnetic field generated by the magnet 112 contained within the belt clip 101. The anchor circuit 122 comprises an anchor battery 151, a reed switch 152, and a transmitter 153.

The anchor battery 151 is a chemical device. The anchor battery 151 converts chemical potential energy into electrical energy. The anchor battery 151 provides the electrical power required to operate the transmitter 153.

The reed switch 152 is a commercially available switch. The presence of the reed switch 152 in a magnetic field actuates the reed switch 152. The magnet 112 interacts with the reed switch 152 contained within the anchor clip 102 such that the reed switch 152 is actuated when the reed switch 152 is exposed to the magnetic field generated by the magnet 112. In the first potential embodiment of the disclosure, as shown most clearly in FIG. 5, the reed switch 152 actuates to the closed position when the reed switch 152 detects the magnetic field generated by the magnet 112. The reed switch 152 actuates to the open position when the reed switch 152 is later removed from the magnetic field generated by the magnet 112.

The transmitter 153 is a radio frequency transmitting device. The transmitter 153 physically generates the radio frequency used to create the wireless communication link 105. The transmitter 153 is a commercially available device. In the first potential embodiment of the disclosure, the transmitter 153 is provisioned as a portion of a 433 MHz remote control switch and transmitter kit.

The alarm fob 103 is a domestic article that is carried by an operator of the vehicle that contains the seatbelt buckle 104. The alarm fob 103 generates a visual signal when the anchor clip 102 detects that the belt connector 141 is properly inserted into the anchor connector 142. The alarm fob 103 generates an audible and tactile signal when the alarm fob 103 detects that the span of the distance between the anchor clip 102 and the alarm fob 103 exceeds a predetermined distance.

The theory of operation of the alarm fob 103 is that the audible and tactile alarm of alarm fob 103 is generated when: a) the belt connector 141 is properly secured to the anchor connector 142; and, simultaneously, b) the operator of the vehicle has left the vicinity of the vehicle. The underlying presumption of the alarm fob 103 is that the attachment of the belt connector 141 to the anchor connector 142 indicates that a passenger is secured in the vehicle and that if the audible and tactile alarm is generated when the vehicle operator has left the vehicle without properly caring for the secured passenger.

The alarm fob 103 comprises an alarm housing 131 and an alarm circuit 132.

The alarm housing 131 is a casing. The alarm housing 131 is a rigid structure. The alarm housing 131 contains the alarm circuit 132. The alarm housing 131 is formed with all apertures and form factors necessary to allow the alarm housing 131 to accommodate the use and operation of the invention 100. Methods to form an alarm housing 131 suitable for the purposes described in this disclosure are well-known and documented in the mechanical arts.

The operator of the vehicle that houses the seatbelt buckle 104 physically carries the alarm housing 131. The alarm circuit 132 is an electrical circuit. The alarm circuit 132 detects the transmission of the wireless communication link 105 by the anchor clip 102. When the alarm circuit 132 detects the wireless communication link 105, the alarm circuit 132 illuminates a visible signal indicating that the belt connector 141 is properly fastened to the anchor connector 142. When the alarm circuit 132 fails to detect the wireless communication link 105, the alarm circuit 132 generates the audible and tactile alarm indicating that the belt connector 141 remains fastened to the anchor connector 142.

The alarm circuit 132 comprises an alarm battery 161, a receiver 162, a speaker 163, a bypass switch 164, a transistor 165, a pull-up resistor 166, a limit resistor 167, and one or more LEDs 168. The transistor 165 is further defined with a collector 171, an emitter 172, and a base 173. The one or more LEDs 168 is further defined with an anode 174 and a cathode 175. The collector 171, the emitter 172, the base 173, the anode 174, and the cathode 175 are defined in greater detail elsewhere in this disclosure.

The alarm battery 161 is a chemical device. The alarm battery 161 converts chemical potential energy into electrical energy. The alarm battery 161 provides the electrical power required to operate the alarm circuit 132.

The receiver 162 is a radio frequency device. The receiver 162 physically receives and demodulates the radio frequency created by the transmitter 153. The receiver 162 is a commercially available device. In the first potential embodiment of the disclosure, the receiver 162 is provisioned as a portion of a 433 MHz remote control switch and transmitter kit.

The speaker 163 is a transducer. The speaker 163 is an electromechanical device that generates audible and tactile stimuli when the wireless communication link 105 is not detected by the alarm circuit 132. In the first potential embodiment of the disclosure, the speaker 163 is a commercially available buzzer.

The bypass switch 164 is an electrical switch. The bypass switch 164 forms a circuit pathway that bypasses the speaker 163. The bypass switch 164 forms an acknowledgment interface that discontinues the audible and tactile alarms generated through the speaker 163.

The transistor 165 is a three-terminal semiconducting device. The transistor 165 operates as a switch. When a voltage is applied to the base 173, current will flow into the base 173 and the transistor 165 will act like a closed switch allowing current to flow from the collector 171 to the emitter 172. When the voltage is removed from the base 173, the transistor 165 will act like an open switch disrupting current flow from the collector 171 to the emitter 172.

The transistor 165 is controlled by the receiver 162. The receiver 162 sends an electrical signal to the base 173 of the transistor 165 such that the transistor 165 operates as a closed switch. When the transistor 165 operates as a closed switch, current flows into the one or more LEDs 168 thereby generating a visible signal. As shown most clearly in FIG. 5, when the receiver 162 discontinues the signal to the base 173, the transistor 165 operates as an open switch and the electric current is rerouted into the speaker 163 which generates the audible and tactile alarms.

The pull-up resistor 166 is an electrical device that limits the flow of current from the alarm battery 161 into the speaker 163, the bypass switch 164, the collector 171, the transistor 165, and the one or more LEDs 168. The limit resistor 167 is an electrical device that limits the flow of current from the receiver 162 into the base 173 of the transistor 165.

Each of the one or more LEDs 168 is a two-terminal semiconducting device used to generate illumination.

The following four paragraphs describe the assembly of the invention 100.

The magnet 112 is contained within the belt clip housing 111. The anchor circuit 122 is contained within the anchor clip housing 121. The alarm circuit 132 is contained within the alarm housing 131.

The reed switch 152 forms a series electrical connection between the first positive terminal of the anchor battery 151 and the transmitter 153. The transmitter 153 forms a series electrical connection between the first negative terminal of the anchor battery 151 and the reed switch 152.

The pull-up resistor 166 forms a series electrical connection between the second positive terminal of the alarm battery 161 and the speaker 163. The pull-up resistor 166 forms a series electrical connection between the second positive terminal of the alarm battery 161 and the bypass switch 164. The pull-up resistor 166 forms a series electrical connection between the second positive terminal of the alarm battery 161 and the collector 171 of the transistor 165.

The speaker 163 electrically connects to the second negative terminal of the alarm battery 161. The bypass switch 164 forms a series electrical connection between the pull-up resistor 166 and the second negative terminal of the alarm battery 161. The emitter 172 of the transistor 165 electrically connects to the anode 174 of each of the one or more LEDs 168. The cathode 175 of each of the one or more LEDs 168 electrically connects to the second negative terminal of the alarm battery 161. The limit resistor 167 forms a series electrical connection between the output of the receiver 162 and the base 173 of the transistor 165. The receiver 162 draws electrical energy from the alarm battery 161.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a chemical device consisting of one or more cells, in which chemical energy is converted into electricity and used as a source of power. Batteries are commonly defined with a positive terminal and a negative terminal.

Buckle: As used in this disclosure, a buckle is a fastening device used for joining a first end of a strap to a second end of the same strap or a different strap. A buckle further comprises a male connector that is attached to a first loose end and a female connector that is attached to a second loose end. The male connector has a pin or other structure that is generally caught by a structure formed in the female connector.

Buzzer: As used in this disclosure, a buzzer is two lead electrical device that generates an audible sound and a tactile vibration when voltage is applied to the two leads.

Child Safety Seat: As used in this disclosure, a child safety seat is a safety device configured for use with an automobile. The child safety seat is a restraining device that protects a child from injury should an unfortunate event occur to the automobile.

Clip: As used in this disclosure, a clip is a fastener that attaches to an object by gripping or clasping the object. A clip is typically spring loaded.

Diode: As used in this disclosure, a diode is a two terminal semiconductor device that allows current flow in only one direction. The two terminals are called the anode and the cathode. Electric current is allowed to pass from the anode to the cathode.

Domestic Article: As used in this disclosure, a domestic article is an item or object: 1) that is commonly found within a household; or, 2) that is commonly carried or worn by a person. Examples of domestic articles include, but are not limited to, clothing, keys and key fobs, personal data devices, glasses, remote controls, or personal storage items such as purses, briefcases, wallets, or cases.

Fob: As used in this disclosure, a fob is a container that: a) contains an electric circuit; and, b) is carried by a person as a domestic article.

Form Factor: As used in this disclosure, the term form factor refers to the size and shape of an object.

Housing: As used in this disclosure, a housing is a rigid casing that encloses and protects one or more devices.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Maintained Switch: A used in this disclosure, a maintained switch is a switch that maintains the position that was set in the most recent switch actuation. A maintained switch works in an opposite manner to a momentary switch.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field.

Power Source: As used in this disclosure, a power source is a source of the energy that enables the operation of the present disclosure. Examples of external power sources include, but are not limited to, electrical power sources and compressed air sources.

Pull-Up Resistor: As used in this disclosure, a pull-up resistor is an electrical resistor that is used to: 1) limit the current flow through a switching device; and, 2) to control the voltage level presented across a switch, a load resistor, or a pull-down resistor.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Receiver: As used in this disclosure, a receiver is a device that is used to receive and demodulate electromagnetic radiation such as radio signals.

Reed Switch: As used in this disclosure, a reed switch is an electrical switch that is actuated by exposure to an externally provided magnetic field.

Remote Control: As used in this disclosure, remote control means the establishment of control of a device from a distance. Remote control is generally accomplished through the use of an electrical device that generates electrically based control signals that are transmitted via radio frequencies or other means to the device.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Speaker: As used in this disclosure, a speaker is an electrical transducer that converts an electrical signal into an audible sound.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

Transistor: As used in this disclosure, a transistor is a general term for a three-terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Transmitter: As used in this disclosure, a transmitter is a device that is used to generate and transmit electromagnetic radiation such as radio signals.

Unfortunate Event: As used in this disclosure, an unfortunate event is an incident that: 1) happens unexpectedly; 2) happens unintentionally; and, 3) has the potential to cause injury and or property damage.

Figure 6:
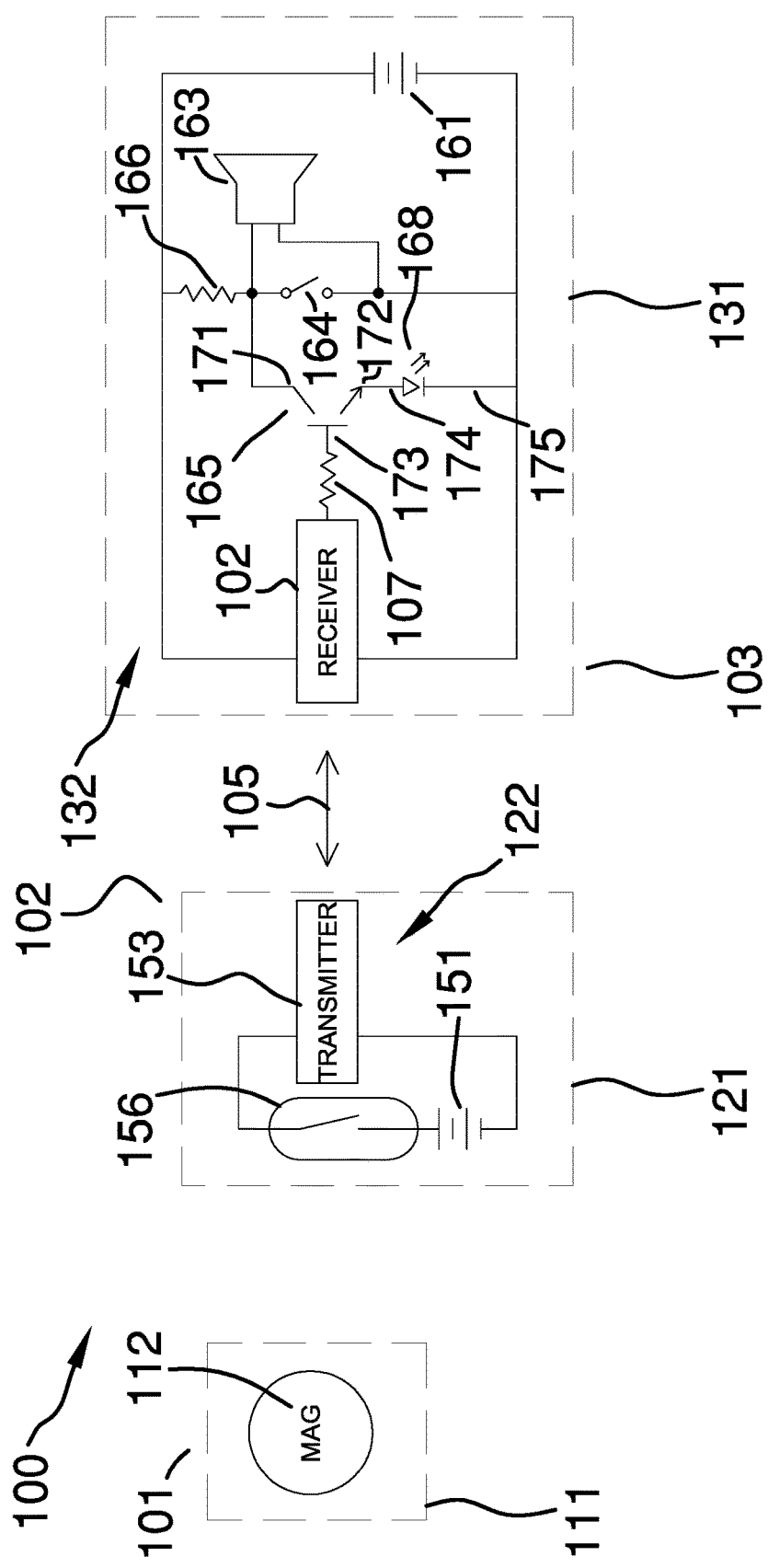
FIG. 6 is a schematic view of an embodiment of the disclosure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A sensing system comprising:
A belt clip, an anchor clip, and an alarm fob;
wherein the alarm fob communicates with the anchor clip using a wireless communication link;
wherein the anchor clip monitors the position of the belt clip relative to the anchor clip;
the sensing system is configured for use with a child safety seat;
wherein the sensing system is configured for use with a seatbelt buckle;
wherein the seatbelt buckle further comprises a belt connector and an anchor connector;
wherein the belt connector removably attaches to the anchor connector;
wherein the sensing system is an alarm and sensor system that attaches to the seatbelt buckle;
wherein the sensing system senses when the belt connector is properly attached to the anchor connector;
wherein the sensing system senses when the span of the distance between the seatbelt buckle and an alarm fob is greater than a previously determined distance;
wherein the sensing system generates a visual signal;
wherein the sensing system generates an audible and tactile alarm;
wherein the belt clip attaches to the belt connector;
wherein the anchor clip attaches to the anchor connector;
wherein the alarm fob monitors the span of distance between the alarm fob and the anchor clip;
wherein the alarm fob comprises an alarm housing and an alarm circuit;
wherein the alarm housing contains the alarm circuit;
wherein the alarm circuit comprises an alarm battery, a receiver, a speaker, a bypass switch, a transistor, a pull-up resistor, a limit resistor, and one or more LEDs;
wherein the alarm battery, the receiver, the speaker, the bypass switch, the transistor, the pull-up resistor, the limit resistor, and the one or more LEDs are electrically interconnected;
wherein the alarm battery is a chemical device;
wherein the receiver is a radio frequency device;
wherein the speaker is a transducer;
wherein the bypass switch is an electrical switch;
wherein the bypass switch forms a circuit pathway that bypasses the speaker;
wherein the transistor is a three-terminal semiconducting device;
wherein the pull-up resistor is an electrical device that limits the flow of current from the alarm battery into the speaker, the bypass switch, the collector, the transistor, and the one or more LEDs;
wherein the limit resistor is an electrical device that limits the flow of current from the receiver into the base of the transistor;
wherein each of the one or more LEDs is a two-terminal semiconducting device used to generate illumination.

2. The sensing system according to claim 1
wherein the belt clip forms a magnetic device;
wherein the belt clip generates a magnetic field that is detected by the anchor clip;
wherein the magnetic field generated by the belt clip is sensed by the anchor clip such that the anchor clip detects the position of the belt clip relative to the anchor clip;
wherein the belt clip actuates the anchor clip when the belt connector is properly fastened to the anchor connector.

3. The sensing system according to claim 2
wherein the anchor clip detects the magnetic field generated by the belt clip;
wherein the anchor clip initiates the wireless communication link between the anchor clip and the alarm fob once the belt clip actuates the anchor clip.

4. The sensing system according to claim 3 wherein when the wireless communication link between the anchor clip and the alarm fob is lost, the alarm fob activates the audio and tactile alarms.

5. The sensing system according to claim 4
wherein the alarm fob is a domestic article;
wherein the alarm fob generates a visual signal when the anchor clip detects that the belt connector is properly inserted into the anchor connector;
wherein the alarm fob generates an audible and tactile signal when the alarm fob detects that the span of the distance between the anchor clip and the alarm fob exceeds the predetermined distance.

6. The sensing system according to claim 5 wherein the wireless communication link is a radio frequency link.

7. The sensing system according to claim 6
wherein the belt clip comprises a belt clip housing and a magnet;
wherein the belt clip housing is a casing;
wherein the belt clip housing contains the magnet.

8. The sensing system according to claim 7
wherein the belt clip housing is a semi-rigid structure with an elastic nature;
wherein the belt clip housing forms a spring structure.

9. The sensing system according to claim 8 wherein the belt clip clamps onto the belt connector of the seatbelt buckle such that the span of the distance between the belt clip and the anchor clip is at a minimum when the belt connector is properly secured to the anchor connector.

10. The sensing system according to claim 9
wherein the magnet is a permanent magnet;
wherein the magnet forms the magnetic field;
wherein the magnetic field surrounds the belt clip.

11. The sensing system according to claim 10
wherein the anchor clip comprises an anchor clip housing and an anchor circuit;
wherein the anchor clip housing contains the anchor circuit;
wherein the anchor clip housing is a semi-rigid structure with an elastic nature.

12. The sensing system according to claim 11 wherein the anchor clip housing forms a spring structure that clamps onto the anchor connector of the seatbelt buckle such that the span of the distance between the belt clip and the anchor clip is at a minimum when the belt connector is properly secured to the anchor connector.

13. The sensing system according to claim 12
wherein the anchor circuit is an electrical circuit;
wherein the anchor circuit generates and terminates the wireless communication link based on the presence of the magnetic field generated by the magnet contained within the belt clip.

14. The sensing system according to claim 13
wherein the anchor circuit comprises an anchor battery, a reed switch, and a transmitter;
wherein the anchor battery, the reed switch, and the transmitter are electrically interconnected.

15. The sensing system according to claim 14
wherein the anchor battery is a chemical device;
wherein the anchor battery provides the electrical power required to operate the transmitter;
wherein the reed switch;
wherein the magnetic field actuates the reed switch;
wherein the transmitter is a radio frequency transmitting device;
wherein the transmitter physically generates the radio frequency used to create the wireless communication link.

16. The sensing system according to claim 15
wherein the alarm housing is a rigid structure;
wherein the alarm circuit is an electrical circuit;
wherein the alarm circuit detects the transmission of the wireless communication link by the anchor clip;
wherein when the alarm circuit detects the wireless communication link, the alarm circuit illuminates a visible signal indicating that the belt connector is properly fastened to the anchor connector;
wherein when the alarm circuit fails to detect the wireless communication link, the alarm circuit generates the audible and tactile alarm indicating that the belt connector remains fastened to the anchor connector.

17. The sensing system according to claim 16
wherein the transistor is further defined with a collector, an emitter, and a base;
wherein the one or more LEDs is further defined with an anode and a cathode.

18. The sensing system according to claim 17
wherein the alarm battery provides the electrical power required to operate the alarm circuit;
wherein the receiver physically receives the radio frequency created by the transmitter;
wherein the speaker generates audible and tactile stimuli when the wireless communication link is not detected by the alarm circuit;
wherein the transistor operates as a switch;
wherein the transistor is controlled by the receiver;
wherein the receiver sends an electrical signal to the base of the transistor such that the transistor operates as a closed switch;
wherein when the transistor operates as a closed switch, current flows into the one or more LEDs thereby generating a visible signal;
wherein when the receiver discontinues the signal to the base, the transistor operates as an open switch and the electric current is rerouted into the speaker.

19. The sensing system according to claim 18
wherein the reed switch forms a series electrical connection between the first positive terminal of the anchor battery and the transmitter;
wherein the transmitter forms a series electrical connection between the first negative terminal of the anchor battery and the reed switch;
wherein the pull-up resistor forms a series electrical connection between the second positive terminal of the alarm battery and the speaker;
wherein the pull-up resistor forms a series electrical connection between the second positive terminal of the alarm battery and the bypass switch;
wherein the pull-up resistor forms a series electrical connection between the second positive terminal of the alarm battery and the collector of the transistor;
wherein the speaker electrically connects to the second negative terminal of the alarm battery;
wherein the bypass switch forms a series electrical connection between the pull-up resistor and the second negative terminal of the alarm battery;
wherein the emitter of the transistor electrically connects to the anode of each of the one or more LEDs;
wherein the cathode of each of the one or more LEDs electrically connects to the second negative terminal of the alarm battery;
wherein the limit resistor forms a series electrical connection between the output of the receiver and the base of the transistor;
wherein the receiver draws electrical energy from the alarm battery.

* * * * *